United States Patent Office 3,544,264
Patented Dec. 1, 1970

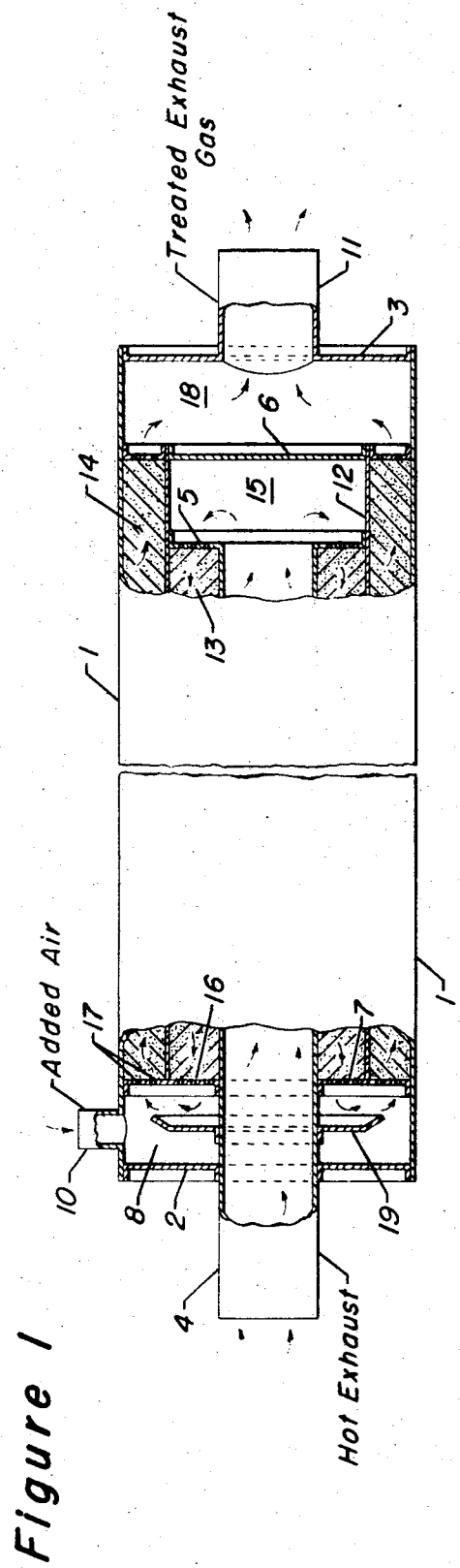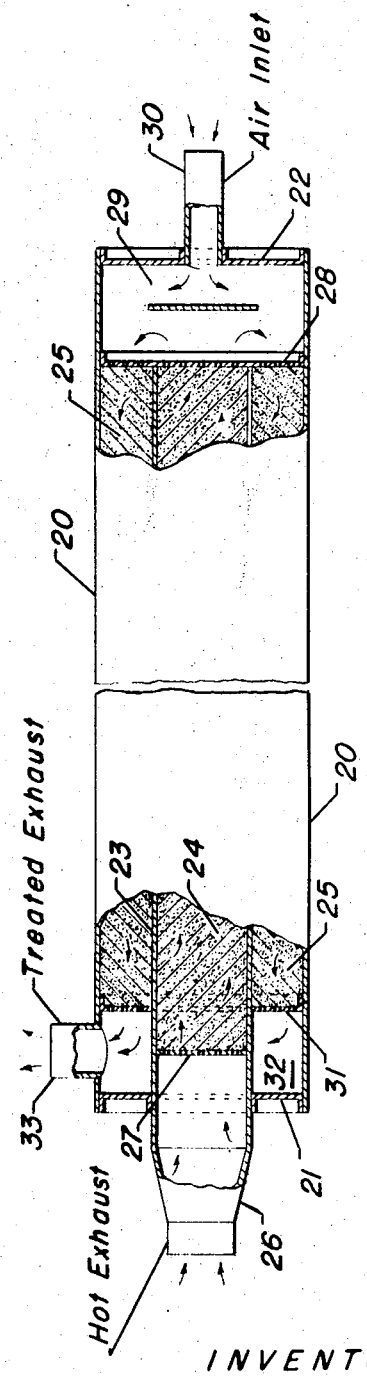

3,544,264
METHOD AND MEANS FOR TWO-STAGE CATALYTIC TREATING OF ENGINE EXHAUST GASES
Leslie C. Hardison, Norwalk, Conn., assignor to Universal Oil Products Company, Des Plaines, Ill., a corporation of Delaware
Filed Sept. 25, 1968, Ser. No. 762,554
Int. Cl. B01d 53/00; B01j 9/04
U.S. Cl. 23—2                    6 Claims

ABSTRACT OF THE DISCLOSURE

A two-stage catalytic treatment of engine exhaust gases by passing the hot gas stream without cooling and without added air through a first internally positioned catalyst section to effect reduction of nitrogen oxides and then mixing air with the resulting stream for passage through a second stage catalyst section so as to effect more complete oxidation of CO and unburned hydrocarbons. A preferred apparatus is built to have the second catalyst stage surround the first and assist in maintaining a high temperature first catalytic reduction section.

---

The present invention relates to an improved two-stage method and means for catalytically treating an engine exhaust gas stream. More specifically, the improved system provides for the catalytic reduction of nitrogen oxides in a first stage catalyst section and then air addition prior to the second stage catalyst contact so that there may be a more complete oxidation of CO and residual hydrocarbons.

The need to remove or convert the noxious components in vehicular exhaust gases is now well established as a means for overcoming general air pollution and the smog problem in specific geographical areas. Further, it appears that it will be necessary to have either a catalytic or thermal after burner means to provide adequate removal of the noxious components from an engine exhaust. It is, of course, realized that there are many types of converters which have been tried and which may be made available for engine exhaust gas treatment. However, a major problem has existed in connection with the removal of nitrogen oxides which are produced in internal combustion engines and which generally pass on through the converter without conversion or removal.

It is thus an object of the present invention to provide an improved two-stage catalytic conversion system which will reduce nitrogen oxides ($NO_x$) content, as well as the carbon monoxide (CO) and hydrocarbons from the stream to be discharged.

It may also be considered an object of the invention to provide a novel two-stage flow scheme and apparatus arrangement such that the first stage $NO_x$ reduction contact is carried out internally, with a minimum of heat loss from the converter, by having the second stage catalytic oxidizing zone encompass the first stage zone.

Auto engines are adjusted to operate at near the stoichiometric air to fuel ratios, but because of nonuniform conditions, including; varying speeds, automatic choking; improper timing etc., there is a relatively high production of nitrogen oxides in the engine itself. These nitrogen oxides can be reduced and removed by an overall type reaction of the nature of:

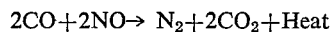

Preferably, for the present system, the exhaust gas stream would be that obtained from a slightly rich mixture so that sufficient CO will be present to permit the catalytic reduction of the $NO_x$ content. Residual oxygen will, however, react with CO in preference to $NO_x$ in the presence of a suitable reduction catalyst.

Broadly, the present invention provides for an improved method of catalytically converting an engine exhaust gas stream to reduce the emission of nitrogen oxides, in a manner which comprises, passing the exhaust gas stream without cooling and without admission of air into contact with a first stage of reduction catalyst to effect catalytic reduction of nitrogen oxides, subsequently mixing air with the resulting product stream and passing the mixture into contact with a second stage catalyst bed maintained in a heat exchange relationship around said first catalyst stage to maintain heat therein and to effect further oxidation and elimination of carbon monoxide and unburned hydrocarbons from the exhaust gas stream.

In another aspect, the present invention embodies a two-stage catalytic converter muffler for treating an engine exhaust gas stream, which comprises in combination, an elongated cylindrical-form outer housing internal cylindrical-form, non-perforate partitioning means spaced from the housing and forming an inner first stage catalyst retaining section and a separate circumscribing second stage annular-form catalyst retaining section, additional partitioning at the downstream end of said inner catalyst section forming an air inlet plenum section between said catalyst retaining sections, as gas inlet to said inner catalyst retaining section, an air inlet to said plenum section, and a treated gas outlet means from said housing and from the downstream end of said annular-form catalyst retaining section.

The reduction catalyst which is utilized in the first stage catalyst section may be any suitable high temperature resistant catalyst adapted for reducing nitrogen oxides into nitrogen and $CO_2$ in accordance with the formula set forth hereinbefore. For example, the catalyst may comprise a copper oxide impregnated on a suitable temperature resistant support material such as aluminum oxide. Also, metal oxide materials of the iron group of metals may be used to advantage as a suitable reducing catalyst in the first stage of contact. A catalytically active component may be used singly, or in combination with one or more other catalyst components, and the active components may be composited with an inorganic refractory oxide, such as alumina, or silica-alumina, silica-alumina-zirconia, silica-thoria, silica-boria, and the like. As to form or shape, the catalyst may be supplied in the form of spheres, cylinders, or pellets which may be retained in a confined bed. Also, the catalyst may be in the form of impregnated fibers which in turn may be placed in a mat-like bed arrangement. Where spheres or pellets are used, then they shall have sufficient dimension, say of the order of $\frac{1}{16}''$ to about $\frac{1}{4}''$, to be readily retained within a perforate catalyst retaining section.

In connection with the oxidizing catalyst used in the second stage zone of the system, it is again not intended to limit the present invention to any one type of catalyst, inasmuch as suitable oxidation catalytic materials may include the metals of Groups I, V, VI and VIII of the Periodic Table particularly copper, silver, vanadium, chromium, iron, cobalt, nickel and platinum or palladium with the components being used singly or in combination with one or more other active components. The active component(s) may be composited with, or supported by, a suitable refractory inorganic oxide, such as alumina or other known inorganic oxides, as set forth hereinbefore in connection with the reducing catalyst support material. Similarly, the catalyst may be of a spherical or pellet-like nature or, alternatively, of fiberous nature and supplied in a mat-like arrangement having physical shape or dimension suitable for placement within a perforate catalyst containing section.

Inasmuch as it is desired to have the improved flow system position the reducing catalyst section where there is a maximum retention of heat, then such section may be on the interior of the housing and surrounded by an annular-form oxidizing catalyst section. Thus, the overall system will normally involve a reverse flow arrangement between catalyst sections, with the treated exhaust gas leaving a first stage gas section at a downstream end thereof in a manner to reverse direction of flow and then pass through a second stage oxidizing catalyst section in a manner to have heat exchange relationship therewith. The air addition to the system, in order to enhance catalytic oxidation in the second stage of contact, may be made at the downstream end of the first stage catalyst contact in a suitable mixing chamber or plenum zone, whereby the air can be uniformly mixed with the exhaust gases prior to entering the second stage zone.

In an apparatus arrangement, a first stage catalyst reducing section may be made of tubular form and the second stage oxidizing catalyst section may be made to be in an annular shape so as to circumscribe the first stage catalyst section. In addition, a suitable mixing section or plenum zone will be provided at the downstream end of the first stage catalyst section in order to introduce and admix air into the gas stream prior to its travel through the outer annular oxidation section.

In another arrangement, which may be preferred for some operations, there may also be an exhaust gas inlet flow carrying axially through the interior of the housing to the end of an interior annular-shaped catalyst zone where there is a reverse flow back through a first stage reducing catalyst. The stream then takes another reverse flow pattern through an encompassing second stage, outer annular catalyst retaining section where there is an oxidizing reaction for the exhaust gas stream prior to discharge from the housing. In this case, the added air will also be at the downstream end of the first stage contact, or inner annular catalyst section, and just ahead of the inlet end to the outer annular catalyst section whereby sufficient air will be present to insure efficient catalytic oxidation of remaining CO and unburned hydrocarbons in the exhaust gas stream.

Reference to the accompanying drawing and the following description thereof will serve to better illustrate the invention and set forth additional advantages in connection therewith.

DESCRIPTION OF THE DRAWING

FIG. 1 of the drawing shows, in a diagrammatic sectional-elevational view, one embodiment of the two-stage converter-muffler, which maintains an inner catalyst reducing section.

FIG. 2 of the drawing shows an alternative and somewhat simplified apparatus arrangement also in a diagrammatic sectional-elevational view, with the first stage catalyst section being tubular and the second stage section being of annular cross-sectional form encompassing the first stage zone.

Referring now particularly to FIG. 1 of the drawing, there is indicated an outer housing 1 having an inlet end tube sheet 2 and an opposing end tube sheet 3. At the inlet end of the unit, a conduit 4 extends through the end tube sheet 2 and carries axially through a major portion of the housing to terminate at a perforate partitioning member 5 and at a spaced distance from an inner non-perforate partitioning member 6. There is also indicated an inner perforate partitioning plate 7 which surrounds the conduit 4 and is spaced inwardly from the end tube sheet 2 in order to form an air inlet plenum section 8 which has an inlet 10 passing through housing 1 into the interior thereof. The plenum section 8 actually serves a dual function in that it provides for the addition of air into the interior of the converter while, at the same time, effecting a redistribution of air and gas into the second stage catalyst section. An intermediate nonperforate cylindrical from partition member 12, extending between plates 6 and 7, is used to define an inner catalyst retaining section 13 and an outer catalyst retaining section 14. An outlet 11 in connection with end plate 3 provides for the discharge of the treated exhaust gas stream from the unit.

In accordance with the present invention, the inner annular-form catalyst retaining section 13 is used to hold a suitable high temperature resistant reducing type catalyst, such as copper oxide on alumina and the outer annular catalyst section 14 will hold a suitable high temperature resistant oxidizing material such as chromium oxide, vanadium oxide, platinum, palladium, or the like, on a suitable support material. Thus, the engine exhaust gas flow into the improved converter-muffler will be axially through non-perforate conduit 4 to a gas distribution section 15 where there will be a reverse flow through perforate partitioning means 5 into reducing section 13 to be discharged into the plenum section 8, from perforate means 16 in partitioning plate 7, for a resulting intermixing with air which is added by way of inlet port 10. Thus, a resulting reduced gas stream and added air reverses flow to pass through openings 17 in partitioning member 7 so as to pass longitudinally through the outer annular catalyst section 14 to be discharged into a collection zone 18 prior to final discharge through exhaust port 11.

It will be seen that the inner catalyst section 13 is in a position to be in heat exchange relationship with the hot exhaust gas stream entering through conduit 4 as well as be in direct contact with partition 12 and in heat exchange relationship with the outer high temperature oxidation section 14, whereby there is a maximum amount of heat available for the nitrogen oxides reducing reaction taking place in section 13. Also, preferably, the entire unit may be rather closely coupled with the exhaust gas manifold of the particular internal combustion engine so that the nitrogen oxides which are formed in the engine will carry to the converter unit at a high temperature and in a form which may be more readily reduced than if they are permitted to carry along under decreasing temperature conditions whereby they will become more difficultly reducible. It is also to be noted that no air is to be added ahead of the converter by way of aspiration or by way of blower means so that the reducing reaction will take place in the presence of the reducing catalyst within section 13 under the most favorable conditions.

After maximum reduction, air is added through zone 8 and the mixture carried into the upstream end of catalyst oxidizing section 14, as heretofore described. In the present embodiment, it will be noted that an additional baffle means 19 has been placed within the plenum section 8 in order to assist the reverse gas flow required as the hot gases leave section 13 and enter the upstream end of section 14. At the same time, the baffle means 19 will assist in effecting an adequate 360° distribution of the air stream from inlet port 10 into the annular form catalyst section 14.

The embodiment of FIG. 1 will generally be of a cylindrical or oval form configuration and of sufficient length to retain an adequate amount of catalyst for maintaining efficient catalytic reduction and catalytic oxidation of the exhaust gas stream. However, a square or other polygonal cross-section form may be used where deemed desirable for a particular application and be within the scope of the present invention. Also, although not shown, it is to be understood that additional internal baffling to preclude gas channeling may be embodied within both of the catalyst retaining sections 13 and 14.

In FIG. 2 of the drawing, there is shown an embodiment with an outer housing 20 having end sections 21 and 22, as well as an internal conduit or continuous partition 23 so as to define an inner catalyst section 24 and an outer annular catalyst section 25. An exhaust gas inlet to the unit is provided through the inlet port means 26 which in turn connects with or communicates with the interior conduit portion 23 so that there is a tubular form catalyst retaining section 24. Longitudinally, the catalyst is retained by an upstream perforate plate means 27 and by a downstream perforate plate means 28. The latter is spaced from the end section 22 so as to provide a distribution zone 29 whereby there is a reverse flow of the exhaust gas stream through perforate partitioning 28 into the catalyst section 25. Provision is also made for the introduction of air by way of port means 30 into redistribution section 29, whereby air will be uniformly mixed with the partially contacted gas stream entering zone 25. The fully treated exhaust gas stream will leave at the downstream end of section stage catalyst contact 25 through perforate plate means 31 to enter into an outlet plenum 32 and then be discharged by way of outlet port 33.

In a manner similar to the arrangement of FIG. 1, it will be seen that the embodiment of FIG. 2 will permit a reducing catalyst contact within an interiorly maintained zone so as to preclude any heat loss from the unit and that there is an encompassing of such section by the oxidizing catalyst zone 25 whereby heat from the latter will, in turn, carry by indirect heat exchange relationship to the periphery of inner zone 24. It will be further noted that there is no air introduction into the first stage catalyst section in order to preclude the production of nitrogen oxides and, in fact, to enhance the $NO_x$ reduction step at the high temperature conditions. The air that is added at the downstream end of this first stage zone 24 insures that there is adequate oxygen available for completion of the oxidation of CO and unburned hydrocarbons to harmless products that can be discharged by way of collection section 32 and outlet port 33.

Preferably, the housing and contact zones will be of a cylindrical or oval form configuration, but as mentioned hereinbefore, the housing and the zones can be of polygonal shape where it is deemed desirable for location or space purposes. Still further, although not shown in the drawing, there may be the addition of suitable insulating materials around the converter-muffler housings in order to retain heat in the catalyst contact sections as well as to preclude high temperature radiation to any sensitive or dangerous areas of the particular vehicle.

I claim as my invention:

1. In the catalytic conversion of an internal combustion engine exhaust gas stream, the improved method of treatment to reduce emission of nitrogen oxides which comprises, passing the exhaust gas stream without cooling and without admission of air into contact with a first stage of reduction catalyst to effect catalytic reduction of nitrogen oxides, subsequently mixing air with the resulting product stream and passing the mixture into contact with a second stage catalyst bed maintained in a heat exchange relationship around said first catalyst stage to maintain heat therein and to effect further oxidation and elimination of carbon monoxide and unburned hydrocarbons from the exhaust gas stream.

2. The method of claim 1 further characterized in that the exhaust gas stream carries to an initial distribution zone and then passes through an annular-form first stage reduction catalyst and then subsequent to the mixing of the resulting stream with air there is a reverse direction of flow and passage through a second stage catalyst bed maintained in an annular bed encompassing said first stage catalyst zone, whereby there is a heat exchange relationship between two adjacent annular shaped catalyst contact zones.

3. The method of claim 1 further characterized in that the first stage catalyst reduction step is effected in a tubular zone maintained within an annular-form second stage of catalyst contact and the resulting contacted stream from the first stage of catalyst contact is mixed with air at the downstream end of the latter zone to then reverse direction of flow and pass through the outer annular second stage oxidizing zone for heat exchange with said inner tubular zone.

4. A two-stage catalytic converter-muffler for treating an engine exhaust gas stream, which comprises in combination, an elongated cylindrical-form outer housing internal cylindrical-form, non-perforate partitioning means spaced from the housing and forming an inner first stage catalyst retaining section and a separate circumscribing second stage annular-form catalyst retaining section, additional partitioning at the downstream end of said inner catalyst section forming an air inlet plenum section between said catalyst retaining sections, a gas stream inlet to said inner first stage section, an air inlet to said plenum section, and a treated gas outlet means for said housing and from the downstream end of said circumscribing second stage catalyst retaining section.

5. The two-stage catalytic converter-muffler of claim 4 further characterized in that said gas inlet to said inner catalyst section carries axially through the central portion of the housing and said inner catalyst retaining section is of an annular shape positioned in between said catalyst inlet and said additional partitioning means forming an outer annular-form catalyst retaining section, whereby gas flow has a reverse direction of flow through said inner catalyst retaining section as compared with the flow into said housing and through said circumscribing annular form catalyst containing section.

6. The two-stage catalytic converter-muffler of claim 4 further characterized in that said inner first stage catalyst containing section is of tubular form positioned axially within said housing and said second stage annular form catalyst containing catalyst section encompasses said inner tubular form catalyst section in indirect heat exchange relationship therewith, and said plenum section and said air inlet thereto are positioned at the downstream end of said inner tubular catalyst section whereby there is a reversal in flow direction for said gas stream to flow, with the added air, through said circumscribing second stage catalyst section.

References Cited

UNITED STATES PATENTS

| | | | |
|---|---|---|---|
| 1,902,160 | 3/1933 | Frazer et al. | 23—2 |
| 3,067,002 | 12/1962 | Reid | 23—2 |
| 3,180,712 | 4/1965 | Hamblin | 23—2 X |
| 3,295,919 | 1/1967 | Henderson et al. | 23—2 |
| 3,370,914 | 2/1968 | Cross et al. | 23—2 |

EARL C. THOMAS, Primary Examiner

U.S. Cl. X.R.

23—288